US012276387B2

(12) United States Patent
Park

(10) Patent No.: US 12,276,387 B2
(45) Date of Patent: Apr. 15, 2025

(54) LAMP FOR VEHICLE

(71) Applicant: HYUNDAI MOBIS CO., LTD., Seoul (KR)

(72) Inventor: Tae Yang Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/494,262

(22) Filed: Oct. 25, 2023

(65) Prior Publication Data

US 2024/0218992 A1 Jul. 4, 2024

(30) Foreign Application Priority Data

Dec. 28, 2022 (KR) ........................ 10-2022-0187682

(51) Int. Cl.

| | |
|---|---|
| ***F21S 41/275*** | (2018.01) |
| ***F21S 41/143*** | (2018.01) |
| ***F21S 41/47*** | (2018.01) |
| ***F21V 5/00*** | (2018.01) |
| ***F21V 5/04*** | (2006.01) |
| *F21W 102/13* | (2018.01) |
| *F21Y 115/10* | (2016.01) |

(52) U.S. Cl.

CPC ........... *F21S 41/275* (2018.01); *F21S 41/143* (2018.01); *F21S 41/47* (2018.01); *F21V 5/004* (2013.01); *F21V 5/008* (2013.01); *F21V 5/04* (2013.01); *F21W 2102/13* (2018.01); *F21Y 2115/10* (2016.08)

(58) Field of Classification Search

CPC ........ F21S 41/275; F21S 41/143; F21S 41/47; F21S 41/255; F21V 5/004; F21V 5/008; F21V 5/04; F21W 2102/13; F21Y 2115/10

See application file for complete search history.

(56) References Cited

U.S. PATENT DOCUMENTS

| | | | | |
|---|---|---|---|---|
| 11,746,982 B1 * | 9/2023 | Lee | ......................... | F21S 41/25 362/520 |
| 2020/0217471 A1 * | 7/2020 | Moser | ..................... | F21S 41/43 |
| 2021/0231280 A1 * | 7/2021 | Schreiber | ................ | F21S 41/47 |
| 2021/0381673 A1 * | 12/2021 | Lee | ......................... | F21V 5/004 |
| 2024/0184021 A1 * | 6/2024 | Kazama | ............... | G02B 3/0031 |

* cited by examiner

*Primary Examiner* — Tracie Y Green

(74) *Attorney, Agent, or Firm* — NovoTechIP International PLLC

(57) ABSTRACT

Disclosed is a lamp for a vehicle including a light source part that generates and outputs light, and a lens array provided on a front side of the light source part, the lens array includes an input lens part including micro input lenses, to which the light is input from the light source part, and an output lens part including micro-output lenses that forms a specific beam pattern by irradiating the light input from the input lens part to a road surface. Each of the micro input lenses includes an input surface formed to be convex toward the light source part, the input surface includes a first input surface, and a second input surface disposed at a periphery of the first input surface, and a radius of curvature of the first input surface and a radius of curvature of the second input surface are different.

10 Claims, 8 Drawing Sheets

10

LAMP FOR VEHICLE

CROSS-REFERENCE TO RELATED APPLICATIONS

This application claims the benefit of priority to Korean Patent Application No. 10-2022-0187682, filed in the Korean Intellectual Property Office on Dec. 28, 2022, the entire contents of which are incorporated herein by reference.

TECHNICAL FIELD

The present disclosure relates to a lamp for a vehicle.

BACKGROUND

A micro lens array (MLA) projects an image with an arrangement of a plurality of micro lenses. The micro lens array displays an image of an excellent quality with a small size, and thus is widely used in various fields.

According to a conventional technology, when a micro lens array is used for a headlamp for a low beam, two micro lens modules are employed according to light distribution features.

In detail, the lens array includes a hot zone module that is a module for a long-distance light distribution pattern (hot zone) for securing a field of view of a central area on a front side of a low beam pattern, and a wide zone module that is a module for a light distribution pattern (wide zone) for securing a peripheral area of the front side and securing a visibility during a turn.

However, as in the conventional technology, when two micro lens modules are used for respective light distribution patterns, a production process of the micro lens arrays becomes disadvantageous, and a profit deteriorates. Furthermore, the lighting produced by the hot zone module and the wide zone module may be different which prevents uniform lighting from being achieved. Accordingly, it is necessary to improve technologies such that production processes may be enhanced and uniform lighting is achieved.

SUMMARY

The present disclosure has been made to solve the above-mentioned problems occurring in the prior art while advantages achieved by the prior art are maintained intact.

An aspect of the present disclosure provides a lamp for a vehicle that implements a plurality of light distribution patterns through one integral micro input lens.

Another aspect of the present disclosure provides a lamp for a vehicle, by which a production process of a lens array may be enhanced, a price competitiveness may be secured, and the quality of the lighting may be enhanced.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part that generates and outputs light, and a lens array provided on a front side of the light source part, the lens array includes an input lens part including a plurality of micro input lenses, to which the light is input from the light source part, and an output lens part including a plurality of micro-output lenses that forms a specific beam pattern by irradiating the light input from the input lens part to a road surface, each of the plurality of micro input lenses includes an input surface formed to be convex toward the light source part, the input surface includes a first input surface, and a second input surface disposed at a periphery of the first input surface, and a radius of curvature of the first input surface and a radius of curvature of the second input surface are different.

The radius of curvature of the first input surface may be formed to be smaller than the radius of curvature of the second input surface.

The light input to the first input surface may be output through the output lens part to form a first light distribution pattern, the light input to the second input surface may be output through the output lens part to form a second light distribution pattern, and the first light distribution pattern and the second light distribution pattern may have different light distribution features, and overlap each other to form the specific beam pattern.

The first light distribution pattern and the second light distribution pattern may overlap each other to form a low beam pattern.

A vertical curvature and a horizontal curvature of the first input surface may be formed to be different, and a vertical curvature and a horizontal curvature of the second input surface may be formed to be different.

When an imaginary vertical plane, which the input lens part and the output lens part contact and which is perpendicular to a ground surface is defined as an imaginary vertical plane, a point of the first input surface, which is most distant from the imaginary vertical plane, is defined as a first point, and a point of the second input surface, which is most distant from the imaginary vertical plane, is defined as a second point, a distance from the imaginary vertical plane to the first point may be larger than a distance from the imaginary vertical plane to the second point.

Each of the plurality of micro-output lenses may be a conic lens.

The micro-output lens may include an output surface, from which the light is output, and a radius of curvature of the output surface may be larger than the radius of curvature of the second input surface.

The lamp may further include a shield part provided between the input lens part and the output lens part, and that shields a portion of the light that passes through the input lens part.

A focus of the output lens part may be located on the shield part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described in the following are embodiments that are suitable for helping understand the technical features of a lamp for a vehicle according to the present disclosure. However, neither the present disclosure is limited by the embodiments described below to be applied nor the technical features of the present disclosure is restricted by the described embodiments, and the present disclosure may be variously modified and carried out without departing from the technical range of the present disclosure.

Figure 1:
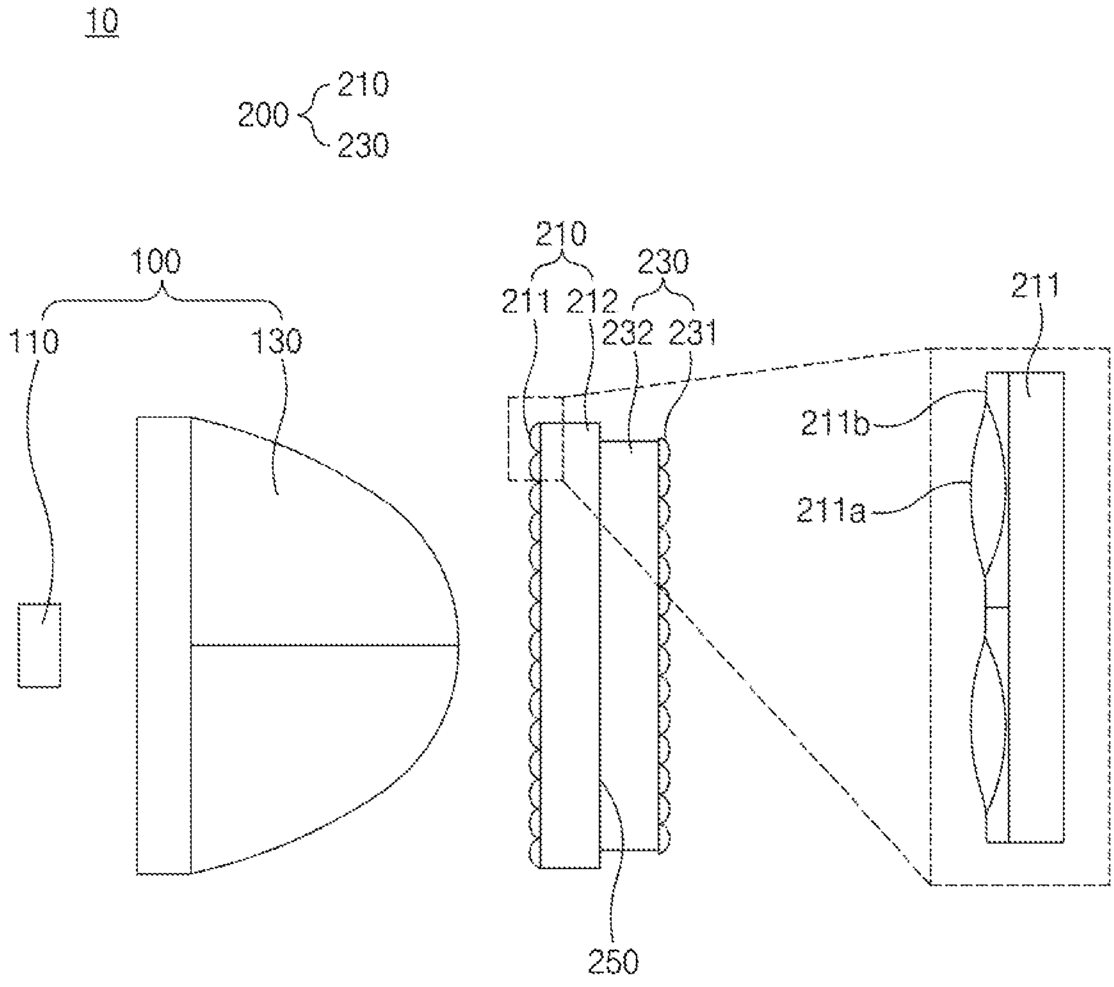
FIG. 1 illustrates a lamp for a vehicle according to an embodiment of the present disclosure, and is a view obtained by viewing the lamp for a vehicle from a lateral side.
Figure 2:
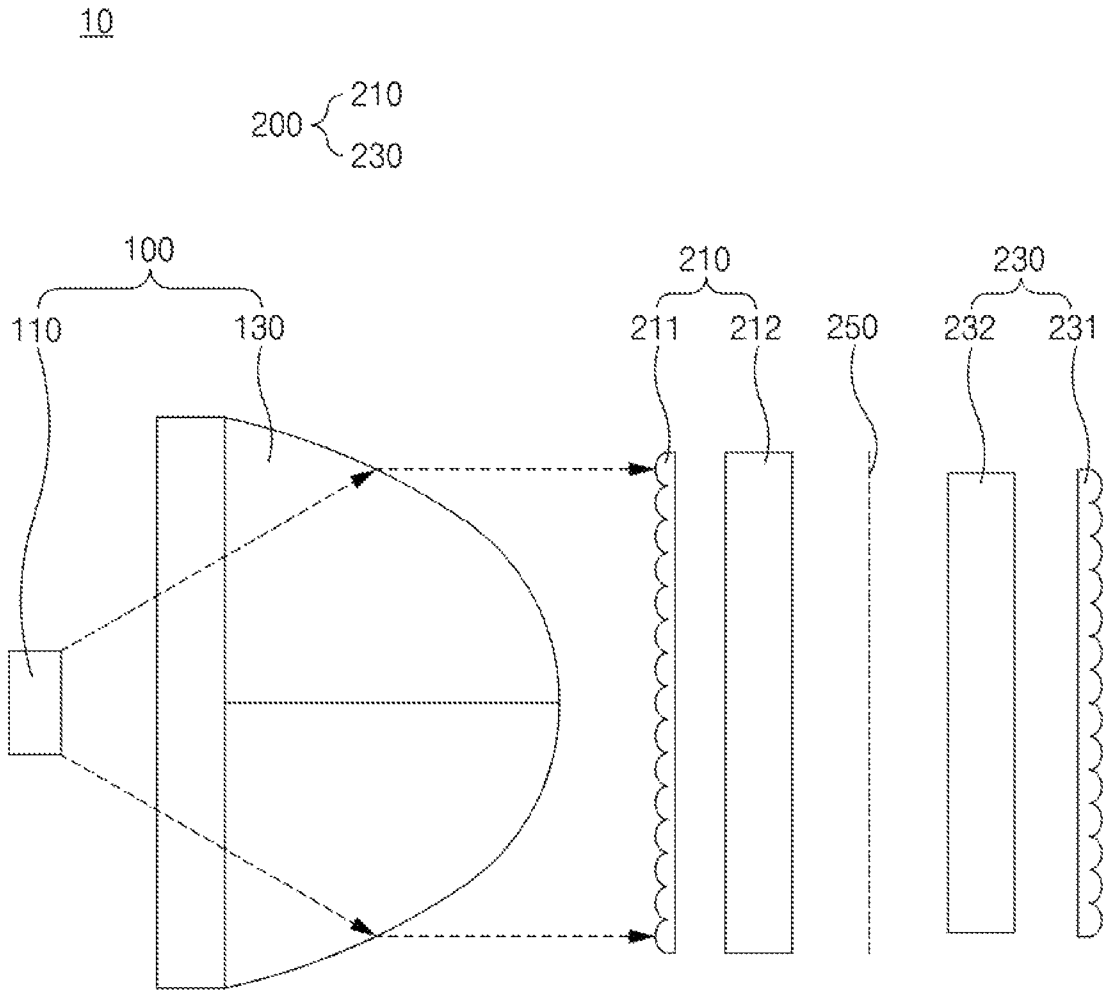
FIG. 2 illustrates a lamp for a vehicle according to an embodiment of the present disclosure, and is an exploded side view of a lens array of FIG. 1.
Figure 3:
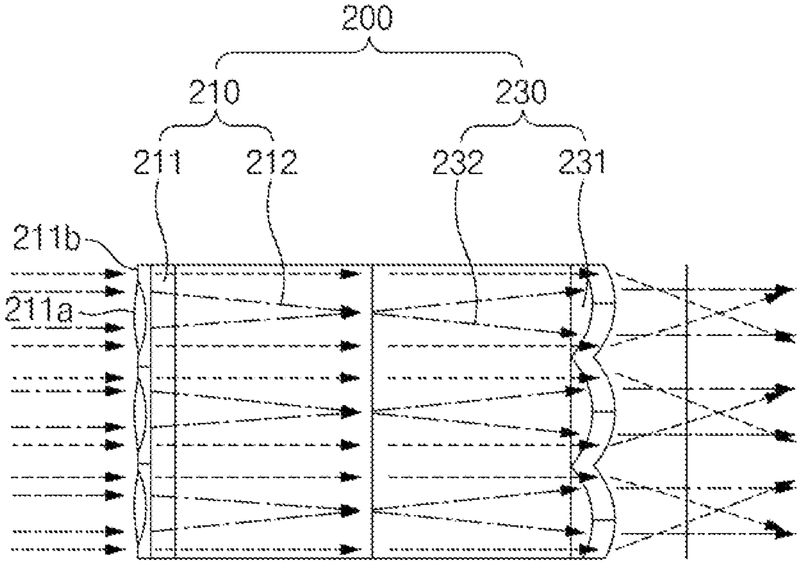
FIG. 3 illustrates an enlarged view of a portion of a lens array illustrated in FIG. 1, and is a view illustrating an optical path.
Figure 4:
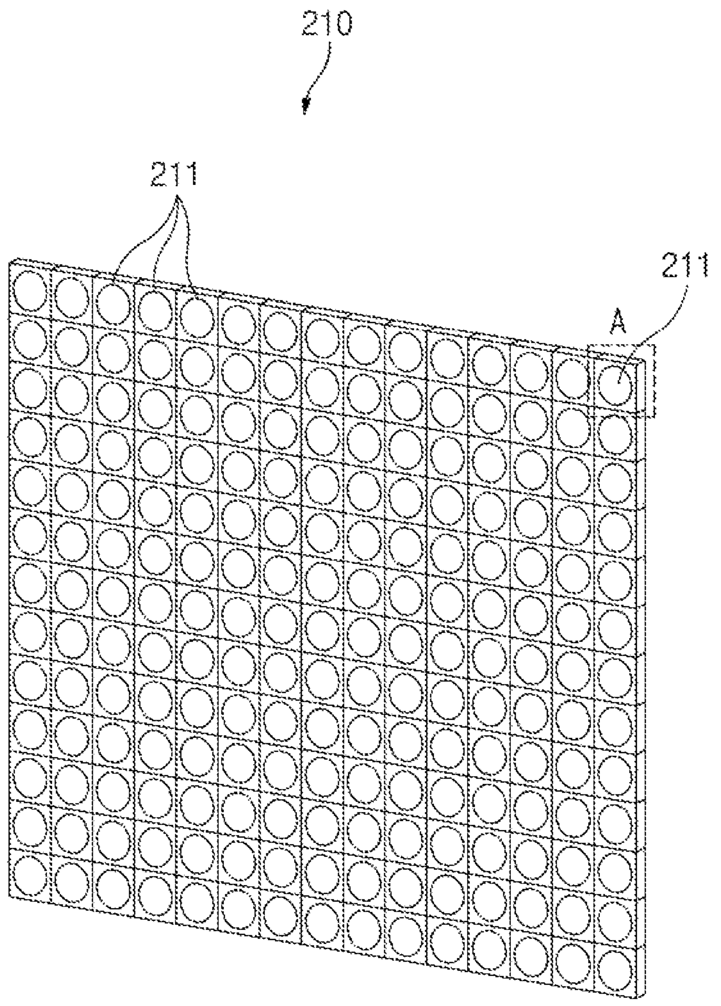
FIG. 4 is a perspective view illustrating a lens array according to an embodiment of the present disclosure.
Figure 5:
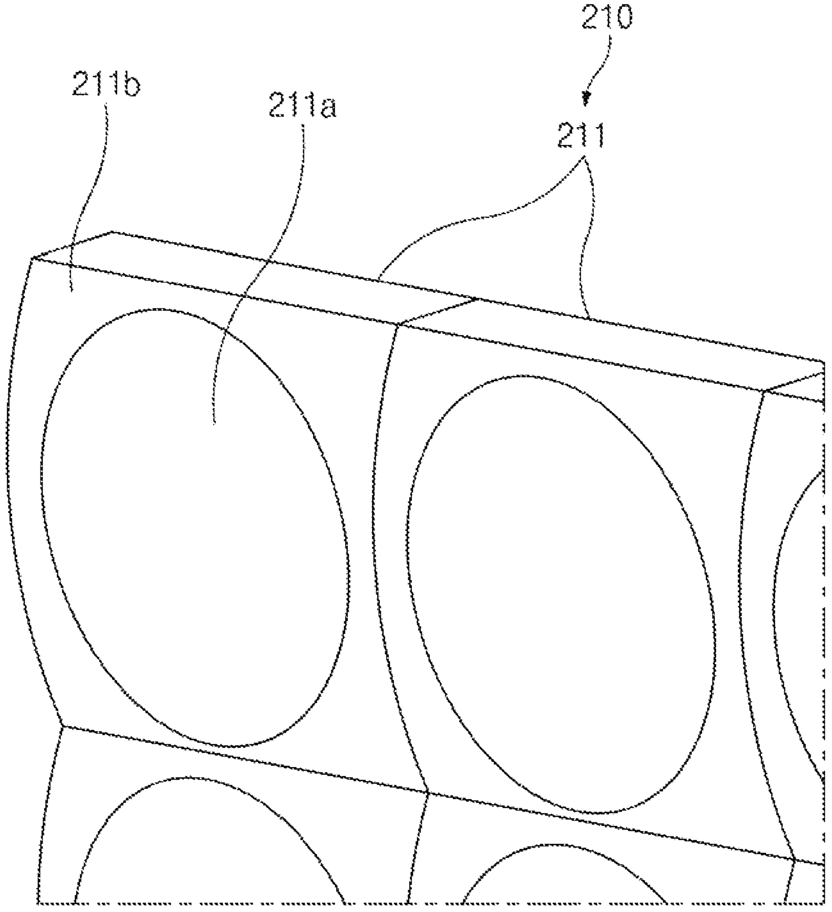
FIG. 5 illustrates a lens array according to an embodiment of the present disclosure, and is an enlarged perspective view illustrating part "A" of FIG. 4.
Figure 6:
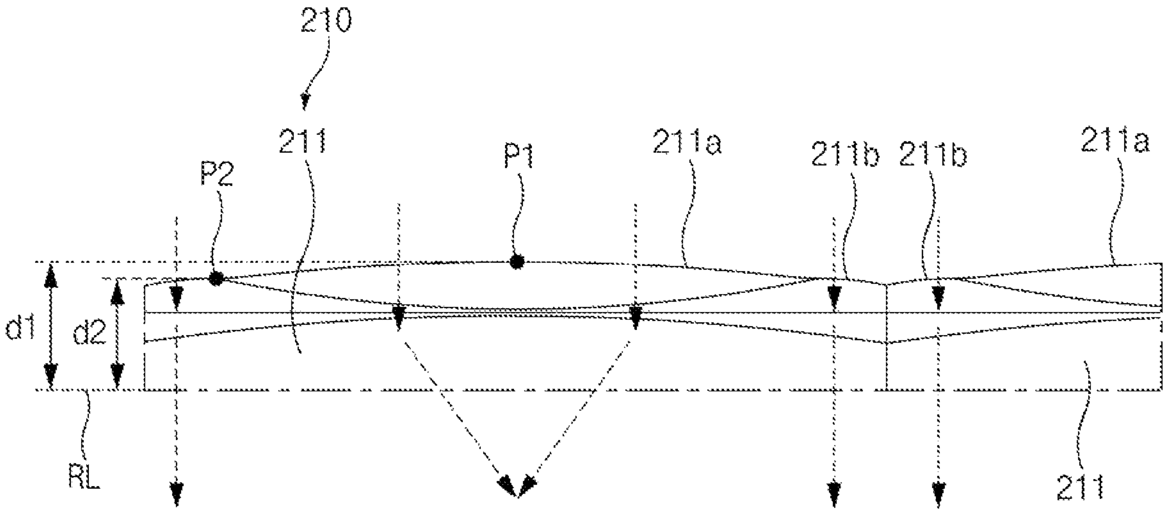
FIG. 6 is a view illustrating an input lens part according to an embodiment.
Figure 7:
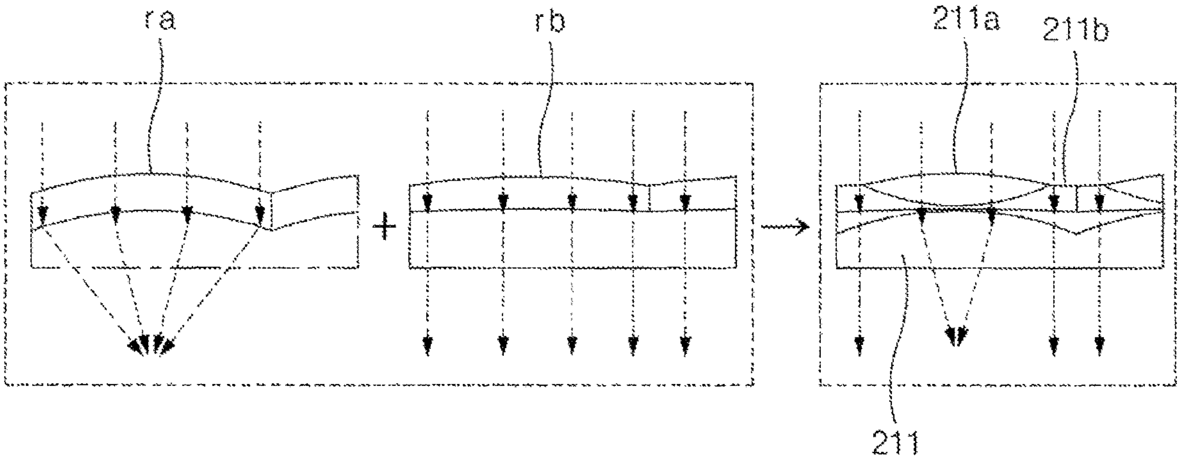
FIG. 7 illustrates an input lens part according to an embodiment of the present disclosure, and is a view illustrating a configuration of an input lens.
Figure 8:
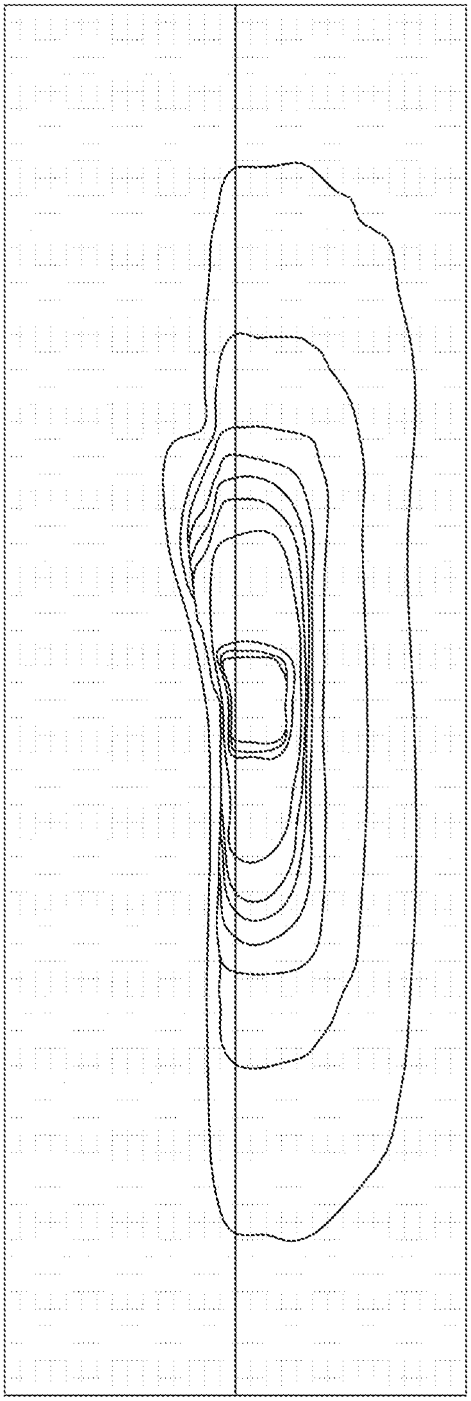
FIG. 8 is a view illustrating a light distribution pattern according to an embodiment of the present disclosure.

FIG. 1 illustrates a lamp for a vehicle according to an embodiment of the present disclosure, and is a view obtained by viewing the lamp for a vehicle from a lateral side, FIG. 2 illustrates the lamp for a vehicle according to an embodiment of the present disclosure, and is an exploded side view of a lens array of FIG. 1, FIG. 3 illustrates an enlarged view of a portion of the lens array illustrated in FIG. 1, and is a view illustrating an optical path, FIG. 4 is a perspective view illustrating the lens array according to an embodiment of the present disclosure; FIG. 5 illustrates the lens array according to an embodiment of the present disclosure, and is an enlarged perspective view illustrating part "A" of FIG. 4. FIG. 6 is a view illustrating an input lens part according to an embodiment, FIG. 7 illustrates the input lens part according to an embodiment of the present disclosure, and is a view illustrating a configuration of the input lens, and FIG. 8 is a view illustrating a light distribution pattern according to an embodiment of the present disclosure.

Referring to FIGS. 1-8, a lamp 10 for a vehicle according to an embodiment of the present disclosure includes a light source part 100 and a lens array 200.

The light source part 100 is configured to generate and output light.

The light is generated and irradiated. The lens array 200 is provided on a front side of the light source part 100 and is configured to output the light input from the light source part 100 to a front side.

For example, the light source part 100 may be configured to irradiate the light in a direction that faces the lens array 200. The light source part 100 may include a light source 110 and a collimator 130. For example, the light source 110 may be a light emitting diode (hereinafter, referred to as an LED), but the present disclosure is not limited thereto. The collimator 130 may convert the light radiated from the light source to light that is parallel to an optical axis and may input the light to an input lens part 210.

The lens array 200 is provided on a front side of the light source part 100. The lens array 200 includes the input lens part 210 and an output lens part 230.

The input lens part 210 includes a plurality of micro input lenses 211, to which the light is input from the light source part 100. Furthermore, the output lens part 230 includes a plurality of micro-output lenses 231 that is configured to form a specific beam pattern by irradiating the light input from the input lens part 210 to a road surface.

Each of the plurality of micro input lenses 211 may include an input surface that is formed to be convex toward the light source part 100.

For example, the micro input lens 211 may include an input surface that is formed to be convex in a direction that faces the light source part 100, and the input surfaces of the plurality of micro input lenses 211 may form an input surface of the entire input lens part 210 together. Furthermore, the micro-output lens 231 may include an output surface that is formed to be convex toward an output direction, and the output surfaces of the plurality of micro-output lenses 231 may form an output surface of the entire output lens part 230 together. However, the shapes of the micro input lens 211 and the micro-output lens 231 are not limited to the above-described ones.

For example, the input lens part 210 may further include an input light transmitting body 212. The input light transmitting body 212 may have the micro input lens 211 on a surface that faces the light source part 100, and may be formed of a light transmitting material.

Furthermore, for example, the output lens part 230 may further include an output light transmitting body 232. The micro-output lens 231 may be formed on a surface that faces an opposite direction to a direction that faces the input light transmitting body 212 such that the light may pass therethrough. Furthermore, the output light transmitting body 232 may be configured to be opposite to the input light transmitting body 212 while a shield part 250 being interposed therebetween.

The input light transmitting body 212 and the output light transmitting body 232 may function as bodies for integrally forming the input lens part 210 and the output lens part 230. However, the present disclosure is not limited thereto, and at least one of the input light transmitting body 212 and the output light transmitting body 232 may be omitted, for example, when the input lens part 210 and the output lens part 230 are not integrally formed.

Meanwhile, the input surface includes a first input surface 211*a*, and a second input surface 211*b* that is disposed at a periphery of the first input surface 211*a*. Furthermore, a radius of curvature of the first input surface 211*a* and a radius of curvature of the second input surface 211*b* may be formed to be different.

In detail, the input surface of the micro input lens 211 may have multiple curvatures. For example, the input surface of the micro input lens 211 may be formed in a form, in which two lenses having different radii of curvature overlap each other while sharing the same optical axis. Accordingly, the input surface may be classified into two areas of different curvatures (see FIG. 7). In FIG. 7, ra may be a curvature of the first input surface 211*a* and rb may be a curvature of the second input surface 211*b*.

For example, the radius of curvature of the first input surface 211*a* may be formed to be smaller than the radius of curvature of the second input surface 211*b*. This is because a lens having a smaller radius of curvature may become more convex in a direction that faces the light source part 100 in a central area of the input surface when the imaginary two lenses having different radii of curvature overlap each other while sharing the optical axis. Accordingly, the first input surface 211*a* disposed in the central area may have a radius of curvature that is smaller than that of the second input surface 211*b* disposed at a periphery.

In this way, in the embodiment of the present disclosure, two light distribution patterns may be formed through one input surface because two input areas having different radii of curvature are provided on the input surface of the one micro input lens 211.

In detail, the light input to the first input surface 211*a* may be output through the output lens part 230 to form a first light distribution pattern. Furthermore, the light input to the second input surface 211*b* may be output through the output lens part 230 to form a second light distribution pattern.

The first light distribution pattern and the second light distribution pattern may have different light distribution features, and may overlap each other to form a specific beam pattern.

The embodiment of the present disclosure may be implemented through one micro input lens 211, in which the first light distribution pattern and the second light distribution pattern, which are different light distribution patterns, are integrally formed. The input lens part 210 of the lens array 200 may be configured such that the same micro input lenses 211 are arranged in a longitudinal direction and a transverse direction. By using the lens array 200, lighting feeling of the lamp 10 for a vehicle may be enhanced.

In detail, when a micro lens for forming the first light distribution pattern and a micro lens for forming the second light distribution pattern are manufactured separately, the radii of the lens input surfaces may be different whereby lighting feelings may be different according to angles of the lenses. The present disclosure may enhance the lighting feeling because the plurality of micro input lenses 211 form the same beam pattern.

For example, the first light distribution pattern and the second light distribution pattern may overlap each other to form a low beam pattern.

In detail, the first light distribution pattern may be a light distribution pattern (hot zone) for securing a field of view of the central area on the front side, and may be a light distribution pattern, of which a light distribution angle of the output light is small and of which a maximum intensity of light is high. The second light distribution pattern may be a light distribution pattern (wide zone) for securing a field of view of a peripheral area on the front side and securing a visibility during a turn, and may be a light distribution pattern, of which a light distribution angle of the output light is large and of which a maximum intensity of light is low. The first light distribution pattern may contribute to a maximum intensity of light of the low beam pattern, and the second light distribution pattern may contribute to a wide light distribution area of the low beam pattern.

A vertical curvature and a horizontal curvature of the first input surface 211*a* may be formed to be different. Furthermore, a vertical curvature and a horizontal curvature of the second input surface 211*b* may be formed to be different.

For example, when an imaginary lens including the first input surface 211*a* and an imaginary lens including the second input surface 211*b* are assumed, the imaginary lens including the first input surface 211*a* and the imaginary lens including the second input surface 211*b* may be anamorphic lenses. Here, the anamorphic lens means a lens, of which an upward/downward radius of curvature and a leftward/rightward radius of curvature are different.

Accordingly, in the embodiment of the present disclosure, a low beam pattern, of which a length in an upward/downward direction is larger than a length thereof in a leftward/rightward direction, is formed.

Meanwhile, referring to FIG. 6, for convenience of description, an imaginary vertical plane, which the input lens part 210 and the output lens part 230 contact and which is perpendicular to the ground surface, is defined as an imaginary vertical plane, a point of the first input surface 211*a*, which is most distant from the imaginary vertical plane, is defined as a first point P1, and a point of the second input surface 211*b*, which is most distant from the imaginary vertical plane, is defined as a second point P2.

A distance d1 from the imaginary vertical plane to the first point P1 may be larger than a distance d2 from the imaginary vertical plane to the second point P2.

Here, as a value of d2/d1 becomes closer to 1, a width of the second input surface 211*b* of the micro input lens 211 becomes larger than a width of the first input surface 211*a* in the micro input lens 211 whereby the low beam pattern has a wider light distribution area.

Meanwhile, as a value of d2/d1 becomes close to 0, an area of the first input surface 211*a* becomes larger than an area of the second input surface 211*b* whereby the maximum intensity of light becomes gradually higher.

Accordingly, the value of d2/d1 of the input surface of the micro input lens 211 may become different according to a design specification of the lamp 10 for a vehicle and a requirement item of the low beam pattern.

Meanwhile, each of the plurality of micro-output lenses 231 may be a conic lens. Here, the conic lens refers to a lens having a curved lens shape, and for example, is a concept including all of a semispherical lens, an elliptical lens, a parabolic lens, and a hyperbolic lens.

The micro-output lens 231 may include an output surface, from which the light is output, and a radius of curvature of the output surface may be formed to be larger than a radius of curvature of the second input surface 211*b*.

In detail, the plurality of micro-output lenses 231 may be formed to correspond to the plurality of micro input lenses 211, respectively. A radius of curvature of the output surface of the micro-output lens 231 may be formed to be larger than a radius of curvature of the input surface of the micro input lens 211. The micro input lens 211 may have multiple curvatures, and a radius of curvature of the first input surface 211*a* may be formed to be smaller than a radius of curvature of the second input surface 211*b*. Accordingly, the output surface of the micro-output lens 231 may be formed to be larger than the second input surface 211*b* of the micro input lens 211.

Meanwhile, the present disclosure may further include the shield part 250. The shield part 250 may be provided between the input lens part 210 and the output lens part 230, and may be configured to shield a portion of the light that passes through the input lens part 210.

For example, the shield part 250 may include a plurality of unit masks (not illustrated). Furthermore, the plurality of unit masks may be provided to correspond to the plurality of micro-output lenses 231, respectively. The unit masks may be masking patterns for forming a beam pattern, and may be masking members for forming a cutoff line of the low beam pattern.

Here, a focus of the output lens part 230 may be located on the shield part 250. In detail, the focuses of the micro-output lenses 231 may be located on the unit masks, respectively. Accordingly, the lamp 10 for a vehicle according to the present disclosure may form a low beam pattern.

According to the above embodiment of the present embodiment, because the plurality of light distribution patterns may be implemented through the one integrated micro input lens, the plurality of micro input lenses provided in the input lens part may be made the same, and thus, a productivity of the lens array may be enhanced and a price competitiveness may be secured.

Furthermore, according to the embodiment of the present disclosure, the lighting feeling of the lamp for a vehicle may be enhanced by unifying the shapes of the plurality of micro input lenses.

Although the specific embodiments of the present disclosure have been described above, the spirits and range of the present disclosure are not limited thereto, and the present disclosure may be variously corrected and modified by an ordinary person in the art, to which the present disclosure pertains, while not changing the essence of the present disclosure described in the claims.

What is claimed is:

1. A lamp for a vehicle, comprising:

a light source part configured to generate and output light; and a lens array arranged on a front side of the light source part, wherein the lens array includes:

an input lens part including a plurality of micro input lenses positioned to receive the light from the light source part; and an output lens part including a plurality of micro-output lenses configured to irradiate the light received by the input lens part to a road surface to form a specific beam pattern wherein each of the plurality of micro input lenses includes an input surface formed to be convex toward the light source part, wherein each input surface includes:

a first input surface; and a second input surface disposed at a periphery of the first input surface, and wherein a radius of curvature of the first input surface in a first direction and a radius of curvature of the second input surface in the first direction are different from each other.

2. The lamp of claim 1, wherein the radius of curvature of the first input surface is formed to be smaller than the radius of curvature of the second input surface.

3. The lamp of claim 1, wherein light received by the first input surface is output through the output lens part to form a first light distribution pattern, wherein light received by the second input surface is output through the output lens part to form a second light distribution pattern, and wherein the first light distribution pattern and the second light distribution pattern have different light distribution features and overlap each other to form the specific beam pattern.

4. The lamp of claim 3, wherein the first light distribution pattern and the second light distribution pattern overlap each other to form a low beam pattern.

5. The lamp of claim 1, wherein a vertical curvature and a horizontal curvature of the first input surface are different from each other, and wherein a vertical curvature and a horizontal curvature of the second input surface are different from each other.

6. The lamp of claim 1, wherein:

for an imaginary vertical plane which the input lens part and the output lens part contact and which is perpendicular to a ground surface, a point of the first input surface, which is most distant from the imaginary vertical plane, is defined as a first point, and a point of the second input surface, which is most distant from the imaginary vertical plane, is defined as a second point, and a distance from the imaginary vertical plane to the first point is larger than a distance from the imaginary vertical plane to the second point.

7. The lamp of claim 1, wherein each of the plurality of micro-output lenses is a conic lens.

8. The lamp of claim 2, wherein each micro-output lens includes an output surface, from which the light is output, and wherein a radius of curvature of the output surface is larger than the radius of curvature of the second input surface.

9. The lamp of claim 1, further comprising:

a shield part provided between the input lens part and the output lens part and configured to shield a portion of the light from passing through the input lens part.

10. The lamp of claim 9, wherein a focus of the output lens part is located on the shield part.

* * * * *